O. W. CHAMBERLAIN.
AUTOMATIC DRIP COFFEE POT.
APPLICATION FILED DEC. 10, 1914.
1,174,683.
Patented Mar. 7, 1916.
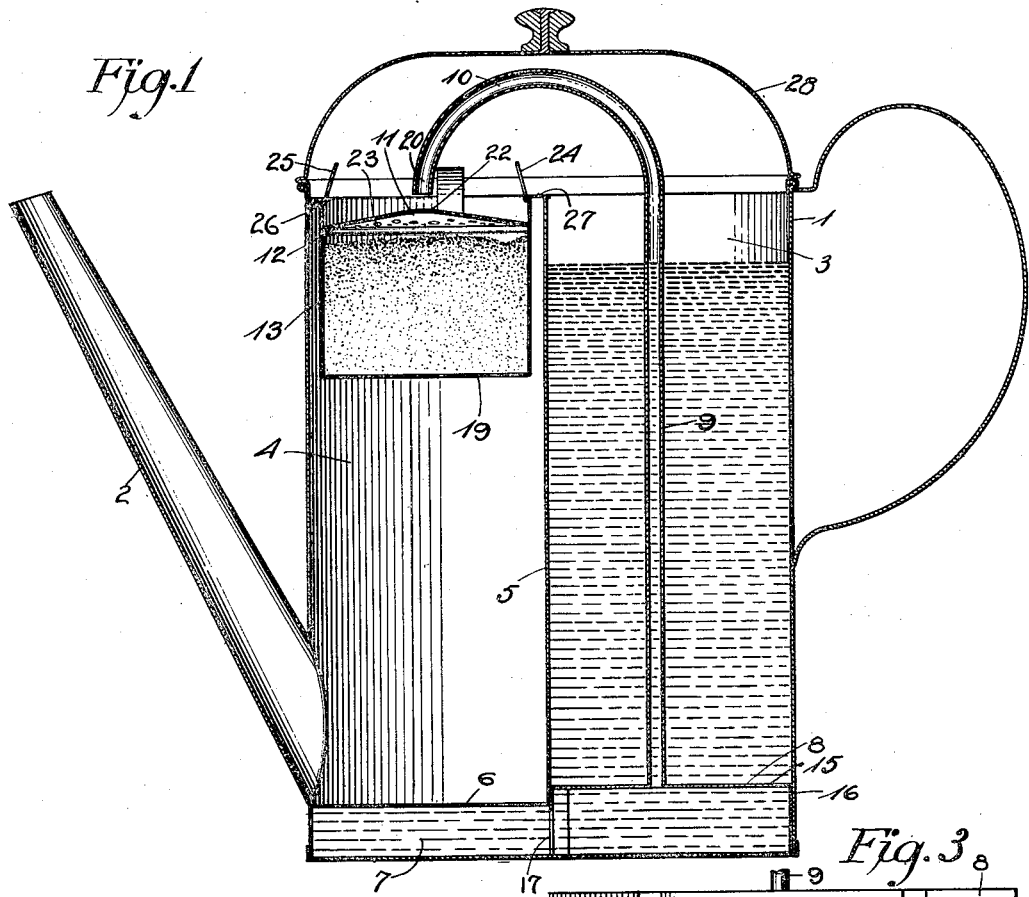
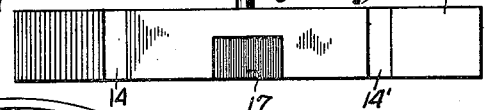
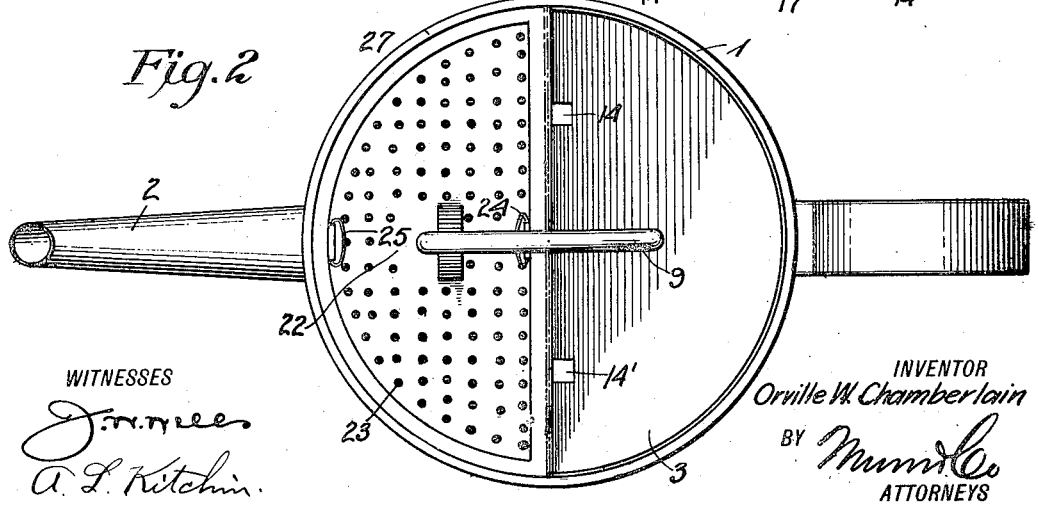
INVENTOR
Orville W. Chamberlain
BY
ATTORNEYS

UNITED STATES PATENT OFFICE.

ORVILLE WALTER CHAMBERLAIN, OF NEW ORLEANS, LOUISIANA.

AUTOMATIC DRIP-COFFEE POT.

1,174,683. Specification of Letters Patent. Patented Mar. 7, 1916.

Application filed December 10, 1914. Serial No. 876,464.

*To all whom it may concern:*

Be it known that I, ORVILLE W. CHAMBERLAIN, a citizen of the United States, and a resident of New Orleans, in the parish of Orleans and State of Louisiana, have invented a new and Improved Automatic Drip-Coffee Pot, of which the following is a full, clear, and exact description.

This invention relates to improvements in coffee pots, and has for an object to provide an improved construction wherein the water is designed to pass through the coffee grounds but once.

Another object in view is to provide an improved construction of coffee pot wherein the made or completed coffee is maintained normally without in any way coming in contact with the grounds.

A further object of the invention is to provide an improved construction of means for forcing hot water in small quantities to a position to be distributed evenly over coffee grounds, whereby the hot water is allowed to percolate freely through the grounds.

In the accompanying drawings—Figure 1 is a longitudinal vertical section through a pot embodying the invention; Fig. 2 is a top plan view of the structure shown in Fig. 1, the lid being eliminated; Fig. 3 is a detailed fragmentary front view of the lower part of the hot water distributing member.

Referring to the accompanying drawings by numerals, 1 indicates a pot which may be of any construction, as for instance a tubular structure as shown in Fig. 1, the same being provided with a spout 2 of any desired shape. Pot 1 is divided into compartments 3 and 4 by a partition 5 which extends from the top of pot 1 to near the bottom where it extends to the front of the pot and forms a false bottom 6. This causes the spout 2 to be in free communication with the compartment 4 but entirely out of communication with compartment 3. This also causes a small compartment 7 below compartment 4, which small compartment merges into compartment 3, and is in free communication therewith at all times. Arranged in compartment 3 is a hot water feeding device 8 which is removably placed in said compartment, and is provided with a comparatively small pipe 9 bent at 10 so as to discharge hot water on to the deflecting member 11 resting on the ledge or bead 12 of the coffee receptacle 13. Pipe 9 is connected in any desired manner to the top of a hood 15. The hood 15 covers the bottom of compartment 3, as shown more particularly in Fig. 2, and is provided with upstanding walls 16 which fit against the side walls of the compartment and also against partition 5. The wall 16 fitting against partition 5 is provided with, preferably, a central opening 17 (Fig. 3) and a pair of grooves 14 and 14'. The opening 17 allows a free communication between the small compartment 7 and the space below the top of hood 15. The grooves 14 extend from the top to the bottom of hood 15 and form a passageway between the water above the hood 15 and the small compartment 7 so that the water from the compartment 3 may pass into compartment 7 and from thence into the space below hood 15, after which it rises in pipe 9 and is discharged into compartment 4.

The water discharging from pipe 9 into compartment 4 passes through receptacle 13 which is preferably provided with solid side walls and a perforated bottom so that the water passing through the grounds in the receptacle may be discharged into the compartment 4. Arranged at the upper part of the receptacle 13 is a deflecting member 11, preferably provided with a solid central portion 22 and a plurality of apertures 23 as clearly shown in Fig. 2. The deflecting member is also preferably bulged upwardly centrally so that the water discharged on the solid portion 22 may freely flow in all directions to evenly distribute the water over the coffee regardless of whether the coffee is perfectly level or not. The pressed out ledge 12 is provided in the receptacle 13 for supporting the lid or deflecting member 11.

In operation the cover or lid 28 is removed and compartment 3 filled with water as shown in Fig. 1. The deflecting member 11 is then removed and any desired quantity of ground coffee placed in the receptacle 13 within a reasonable limit, preferably the coffee not being of greater depth than shown in Fig. 1 so that the deflecting member 11 may again be replaced so as to rest on the beads 12 which are preferably pressed from the sides of the receptacle though the same may be independent members and secured thereto in any desired manner without departing from the spirit of the invention. After the various parts have been supplied and adjusted as just described the pot is placed upon the stove or suitable heating member and as the water in the small compartment 7 and in the space below hood 15 is heated the same passes upwardly through pipe 9 and is discharged upon the distributing member 11. As the water passes through the apertures in member 11 the same drops on to the coffee and percolates downwardly through the coffee to the bottom of the receptacle 13. The water passing through the apertures 23 in member 11 will drop into the coffee and percolate therethrough so as to finally be discharged out the apertures in bottom 19. When the device is in operation the passage of water in this manner is practically continuous until all of the water or a sufficient part thereof from compartment 3 is in compartment 4.

As the heated water reaches the hood 15 fresh water passes into the hood through the apertures 14, which fresh water is heated and is discharged in a similar manner as just mentioned. The amount of water discharged in a given time may be regulated by the size of the pipe 9 or the heat applied so that only a small amount will be fed at any given time to the receptacle 13. It will be noted that the water fed in this manner passes through the coffee grounds and is finally discharged in the compartment 4 ready for use as a beverage. The beverage once entering the compartment 4 is not boiled again nor is it again passed through the coffee grounds so that the best results are obtained. Whenever it is desired to clean the receptacle 13 or remove the same for any purpose the handholes 24 and 25 are grasped and the receptacle bodily removed, the same having for its supports partition 5 and a flange 26 pressed in from the pot 1. In order to properly rest on these supports the receptacle is provided with substantially annular flanges 27.

What I claim is—

1. In a coffee pot of the character described, a body, a partition member for dividing said body into a water compartment and a coffee compartment, a coffee grounds receiving receptacle arranged in said coffee compartment, and means for feeding water at a slow rate of speed to a position above said receptacle, said means including a pipe curved at the upper end for discharging the water substantially centrally of said receptacle, and a removable hood at the bottom of the water compartment for isolating the heated water from the remaining water in the water compartment.

2. A coffee pot comprising a body divided into two distinct compartments, one of said compartments acting as a water compartment and the other as a coffee compartment, a discharge member in communication with said coffee compartment, means arranged in said water compartment for supplying heated water at a slow rate to said coffee compartment, said water being supplied only once, whereby the water passing through the coffee grounds arranged in the coffee compartment does so only once, a receptacle arranged in said coffee compartment for receiving the grounds, and a distributing member for distributing the water over the grounds in said receptacle, said distributing member being formed with a solid central portion on which the water is diffused, and with a perforated portion surrounding said solid portion for receiving the water and distributing the same in small quantities.

3. A coffee pot comprising a body, a partition for dividing said body into a coffee compartment and a water compartment, said partition falling short of the bottom and extending transversely or parallel with the bottom across said coffee compartment so as to present a false bottom therefor, a coffee receptacle arranged in said coffee compartment, a water feed pipe extending from said water compartment into said coffee compartment and arranged to discharge water on said receptacle and a hood arranged at the bottom of said water compartment connected with said water feed pipe, said hood being formed with a solid top having a pair of cross grooves extending therefrom on one side, said grooves affording communication between said water compartment and the space below said coffee compartment, one of the walls of said hood being formed with an opening affording communication between the space below said coffee compartment and the interior of said hood.

4. A coffee pot comprising a body divided into a coffee compartment and a water compartment, a discharge member in communication with the coffee compartment, means for feeding water from said water compartment into the coffee compartment, a coffee grounds receptacle through which the water from said water compartment must pass, and a distributing member for receiving the water from the water compartment, said distributing member being formed with a solid central portion and a foraminous portion surrounding said solid central portion for distributing evenly the water fed into the coffee compartment.

5. A coffee pot comprising a body, a partition for dividing said body into a coffee compartment and a water compartment, said partition falling short of the bottom and extending transversely or parallel with the bottom so as to present a false bottom for the coffee compartment, a discharge member in communication with said coffee compartment, a removable water distributing member arranged in said water compartment, said member being formed with a hood near the bottom of said compartment, said hood being formed with an aperture for providing communication between the hood and the space beneath the coffee compartment and with a circulating passageway between the space beneath the coffee compartment and the space above said hood, said hood having connected therewith a pipe leading from said hood upwardly to a position above the coffee compartment so as to discharge therein, and means for supporting coffee grounds in said coffee compartment beneath the discharge end of said pipe.

6. A coffee pot comprising a body, a partition for dividing said body into a coffee compartment and a water compartment, means for supporting coffee grounds in said coffee compartment, and means for directing water from the water compartment into the coffee compartment above the means for receiving the coffee grounds, the water distributing means comprising a removable hood presenting a false bottom spaced from the bottom of said body and a pipe leading from said hood to a point above the coffee compartment, said hood being formed with means presenting a communicating passageway between the space below said hood and the space above the same.

In testimony whereof I have signed my name to this specification in the presence of two subscribing witnesses.

ORVILLE WALTER CHAMBERLAIN.

Witnesses:
S. R. HOOVER,
G. SMITH.